US009634978B2

(12) United States Patent
Jandhyala et al.

(10) Patent No.: US 9,634,978 B2
(45) Date of Patent: Apr. 25, 2017

(54) SYSTEMS AND METHODS FOR IMPROVING EFFICIENCY OF ELECTRONIC TRANSMISSION OF MESSAGES

(71) Applicant: University of Washington through its Center for Commercialization, Seattle, WA (US)

(72) Inventors: Vikram Jandhyala, Seattle, WA (US); Arun Sathanur, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 289 days.

(21) Appl. No.: 14/597,117

(22) Filed: Jan. 14, 2015

(65) Prior Publication Data

US 2015/0200905 A1    Jul. 16, 2015

Related U.S. Application Data

(60) Provisional application No. 62/015,814, filed on Jun. 23, 2014, provisional application No. 61/969,968,
(Continued)

(51) Int. Cl.
*G06F 15/16* (2006.01)
*G06N 5/00* (2006.01)
(Continued)

(52) U.S. Cl.
CPC ............ *H04L 51/32* (2013.01); *G06Q 50/01* (2013.01); *G06Q 10/107* (2013.01); *H04L 51/04* (2013.01); *H04L 51/14* (2013.01); *H04L 51/36* (2013.01)

(58) Field of Classification Search
CPC ......... H04L 51/32; H04L 51/31; H04L 51/36; H04L 51/04; G06Q 50/01; G06Q 50/107
(Continued)

(56) References Cited

U.S. PATENT DOCUMENTS 8,244,664 B2   8/2012   Ghosh et al.
8,249,231 B2   8/2012   Chakraborty et al.
(Continued)

OTHER PUBLICATIONS

Palla, G., et al., "Uncovering the Overlapping Community Structure of Complex Networks in Nature and Society," Nature 435(7043):814-818, Jun. 2005.
(Continued)

*Primary Examiner* — Ario Etienne
*Assistant Examiner* — Sahera Halim
(74) *Attorney, Agent, or Firm* — Christensen O'Connor Johnson Kindness PLLC

(57) ABSTRACT

Systems and methods for improving the efficiency of propagating electronic messages are provided. In some embodiments, a feed of activities on a network such as an online social network (OSN) is analyzed to determine influenced activity probabilities and intrinsic activity probabilities for participants in the network. A Helmhotz Green's Function matrix is determined in order to calculate an overall influence weight for each participant in the network. A Woodbury-Sherman-Morrison formula may be used to accelerate computation of the Helmholtz Green's Function matrix, thus allowing efficient updates to the overall influence weights based on newly monitored activities. The participants with the highest overall influence weights may be selected to propagate a new message, thus providing the greatest likely distribution of the message with the fewest originating transmissions.

18 Claims, 5 Drawing Sheets

Related U.S. Application Data filed on Mar. 25, 2014, provisional application No. 61/927,389, filed on Jan. 14, 2014.

(51) Int. Cl.
   G06F 15/173 (2006.01)
   H04L 12/58 (2006.01)
   G06Q 50/00 (2012.01)
   G06Q 10/10 (2012.01)

(58) Field of Classification Search
   USPC ....... 709/206, 203, 205, 204, 224, 227, 228; 706/46, 45, 12
   See application file for complete search history.

(56) References Cited

U.S. PATENT DOCUMENTS

| | | |
|---|---|---|
| 8,250,069 B2 | 8/2012 | Jandhyala |
| 8,312,056 B1 | 11/2012 | Peng et al. |
| 2005/0256949 A1 | 11/2005 | Gruhl et al. |
| 2009/0063254 A1 | 3/2009 | Paul et al. |
| 2009/0281851 A1 | 11/2009 | Newton et al. |
| 2010/0241713 A1 | 9/2010 | Shimizu |
| 2012/0117059 A1 | 5/2012 | Bailey et al. |
| 2013/0041860 A1 | 2/2013 | Lawrence et al. |

OTHER PUBLICATIONS

Peixoto, T.P., "Graph-Tool: Efficient Network Analysis With Python—What is Graph-Tool?" Graph-tool, <http://graph-tool.skewed.de/> [retrieved Nov. 2016], 3 pages.

Porter, M.A., et al., "Communities in Networks," Notices of the American Mathematical Society 56(9):1082-1097 and 1164-1166, Oct. 2009.

Ressler, S., "Social Network Analysis as an Approach to Combat Terrorism: Past, Present, and Future Research," Homeland Security Affairs 2, Article 8, Jul. 2006, <https://www.hsaj.org/articles/171> [retrieved Nov. 7,2016], 10 pages.

Rivest, R., et al., "A Method for Obtaining Digital Signatures and Public-Key Cryptosystems," Communications of the ACM 21(2):120-126, Feb. 1978.

Romero, D.M., et al., "Influence and Passivity in Social Media," Joint European Conference on Machine Learning and Knowledge Discovery in Databases, 2011, vol. 6913 of Lecture Notes in Computer Science, Springer-Verlag, Berlin, pp. 18-33.

Rosvall, M., and C.T. Bergstrom, "Maps of Random Walks on Complex Networks Reveal Community Structure," Proceedings of the National Academy of Sciences USA 105(4):1118-1123, Jan. 2008.

Sarwar, B., et al., "Incremental Singular Value Decomposition Algorithms for Highly Scalable Recommender Systems," Proceedings of the Fifth International Conference on Computer and Information Technology, Dhaka, Bangladesh, Dec. 27-28, 2002, 6 pages.

Sathanur, A.V., et al., "Design Automation for Large Scale Social Networks," poster presented at the IEEE/ACM 2013 Design Automation Conference, Austin, Texas, Jun. 2-6,2013, 2 pages.

Sathanur, A.V., et al., "PHYSENSE: Scalable Sociological Interaction Models for Influence Estimation on Online Social Networks," Proceedings of the 2013 IEEE International Conference on Intelligence and Security Informatics (ISI), Seattle, Jun. 4-7, 2013, pp. 358-363.

Sathanur, A.V., et al., "Simulating Context-Driven Activity Cascades in Online Social Networks on the Google Exacycle Platform," Proceedings of the 2014 IEEE International Conference on Systems, Man, and Cybernetics (SMC), San Diego, Oct. 5-8, 2014, pp. 1388-1391.

Sathanur, A.V., and V. Jandhyala, "An Activity-Based Information-Theoretic Annotation of Social Graphs," Proceedings of the 2014 ACM Conference on Web Science (WebSci '14), Bloomington, Indiana, Jun. 23-26, 2014, pp. 187-191.

Schreiber, T., "Measuring Information Transfer," Physical Review Letters 85(2):461-464, Jul. 2000.

Shafiq, Z., et al., "Identifying Leaders and Followers in Online Social Networks," IEEE Journal on Selected Areas in Communications/Supplement 31(9):618-628, Sep. 2013.

Skillicorn, D.B., "Beyond Keyword Filtering for Message and Conversation Detection," International Conference on Intelligence and Security Informatics (ISI 2005): Intelligence and Security Informatics, Lecture Notes in Computer Science, Intelligence and Security Informatics, vol. 3495, May 2005, pp. 231-243.

Tong, H., et al., "Fast Random Walk With Restart and Its Applications," Proceedings of the Sixth International Conference on Data Mining, Hong Kong, Dec. 18-22,2006, pp. 613-622.

Tunkelang, D., "A Twitter Analog to PageRank," The Noisy Channel Blog, Jan. 13, 2009, <http://thenoisychannel.com/2009/01/13/a-twitter-analog-to-pagerank> [retrieved Nov. 7, 2016], 15 pages.

Ugander, J., et al., "The Anatomy of the Facebook Social Graph," Nov. 18, 2011, <http://arxiv.org/abs/1111.4503> [retrieved Nov. 7, 2016], 17 pages.

Vázquez, A., et al., "Modeling Bursts and Heavy Tails in Human Dynamics," Physical Review E 73:036127, Mar. 2006.

Ver Steeg, G., and A. Galstyan, "Information-Theoretic Measures of Influence Based on Content Dynamics," Proceedings of the Sixth ACM International Conference on Web Search and Data Mining, Rome, Feb. 4-8, 2013, pp. 3-12.

Ver Steeg, G., and A. Galstyan, "Information Transfer in Social Media," Proceedings of the 21st International Conference on World Wide Web, Lyon, France, Apr. 16-20, 2012, pp. 509-518.

Vicente, R., et al., "Transfer Entropy—A Model-Free Measure of Effective Connectivity for the Neurosciences," Journal of Computational Neuroscience 30(1):45-67, Feb. 2011.

Wang, C., and B.A. Huberman, "How Random Are Online Social Interactions?" Scientific Reports 2:633, Sep. 2012.

Wang, D., et al., "Information Spreading in Context," Proceedings of the 20th ACM International Conference on World Wide Web, Hyderabad, India, Mar. 28-Apr. 1, 2011, pp. 735-744.

Wang, D., et al., "'Like Attracts Like!'—A Social Recommendation Framework Through Label Propagation," 2011, Workshop on Social Web Search and Mining: Content Analysis Under Crisis, <http://www.cse.cuhk.edu.hk/~king/PUB/SIGIR2011-SWSM-Wang.pdf > [retrieved Nov. 2016], 9 pages.

Welch, M.J., et al., "Topical Semantics of Twitter Links," Proceedings of the Fourth ACM International Conference on Web Search and Data Mining, New York, Feb. 2011, pp. 327-336.

Weng, J., et al., "TwitterRank: Finding Topic-Sensitive Influential Twitterers," Proceedings of the Third ACM International Conference on Web Search and Data Mining, New York, Feb. 3-6, 2010, pp. 261-270.

Weng, L., et al., "Virality Prediction and Community Structure in Social Networks," Scientific Reports 3:2522, Aug. 2013.

Wibral, M., et al., "Measuring Information—Transfer Delays," PLoS One 8(2):e55809, Feb. 2013, 19 pages.

Wu, F., et al., "Information Flow in Social Groups," Physica A: Statistical Mechanics and Its Applications 337(1-2):327-335, Jun. 2004.

King, C., and V. Jandhyala, "Wave Operators and Green's Functions on Random Graphs," Proceedings of the 2012 IEEE Antennas and Propagation Society International Symposium and USNC/URSI National Radio Science Meeting, Chicago, Jul. 8-14, 2012, 2 pages.

Yamaguchi, Y., et al., "TURank: Twitter User Ranking Based on User-Tweet Graph Analysis," International Conference on Web Information Systems Engineering, Hong Kong, Dec. 12-14, 2010, pp. 240-253.

Yang, Z., et al., "Understanding Retweeting Behaviors in Social Networks," Proceedings of the 19th ACM International Conference on Information and Knowledge Management, Toronto, Oct. 26-30, 2010, pp. 1633-1636.

Zimbra, D., and H. Chen, "Scalable Sentiment Classification Across Multiple Dark Web Forums," Proceedings of the 2012 IEEE International Conference on Intelligence and Security Informatics, Washington DC, Jun. 11-14, 2012, pp. 78-83.

(56) References Cited

OTHER PUBLICATIONS

Bahmani, B., et al., "Fast Incremental and Personalized PageRank," Proceedings of the VLDB Endowment 4(3):173-184, available online at: arXiv:1006.2880v2, Aug. 31, 2010.

Bakshy, E., et al., "Everyone's an Influencer: Quantifying Influence on Twitter," Proceedings of the Fourth ACM International Conference on Web Search and Data Mining, Hong Kong, Feb. 9-12, 2011, pp. 65-74.

Barbási, A.-L., et al., "Scale-Free Characteristics of Random Networks: The Topology of the World Wide Web," Physica A 281(1-4):69-77, Jun. 2000.

Bauer, T.L., et al., "Use of Transfer Entropy to Infer Relationships From Behavior," Proceedings of the Eighth Annual Cyber Security and Information Intelligence Research Workshop (CSIIRW '13), Article No. 35, Oak Ridge, Tenn., Oct. 30-Nov. 2, 2012, 4 pages.

Berry, M.W., et al., "Using Linear Algebra for Intelligent Information Retrieval," SIAM Review 37(4):573-595, Dec. 1995.

BeEvolve.com, "An Exhaustive Study of Twitter Users Across the World," Oct. 10, 2012, <http://www.beevolve.com/twitter-statistics> [retrieved Nov. 7, 2016], 8 pages.

Blondel, V., et al., "Fast Unfolding of Communities in Large Networks," Journal of Statistical Mechanics: Theory and Experiment, Oct. 2008, 13 pages.

Borgatti, S.P., "Centrality and Network Flow," Social Networks 27(1):55-71, Jan. 2005.

Brakerski, Z., et al., "(Leveled) Fully Homomorphic Encryption Without Bootstrapping," Proceedings of the Third Innovations in Theoretical Computer Science Conference (ITCS '12), Cambridge, Mass., Jan. 8-10, 2012, pp. 309-325.

Brin, S., and L. Page, "The Anatomy of a Large-Scale Hypertextual Web Search Engine," Proceedings of the Seventh International Conference on World Wide Web, Computer Networks and ISDN Systems 30(1-7):107-117, Apr. 1998.

Cha, M., et al., "Measuring User Influence on Twitter: The Million Follower Fallacy," Proceedings of the Fourth International Association for the Advancement of Artificial Intelligence Conference on Weblogs and Social Media, Washington DC, pp. 10-17.

Chung, F., and R.M. Richardson, "Weighted Laplacians and the Sigma function of a graph," in G. Berkolaiko et al. (eds), in "Contemporary Mathematics: Quantum Graphs and Their Applications," AMS, Providence, R.I., 2006, vol. 415, pp. 93-107.

Coffman, T., et al., "Graph-Based Technologies for Intelligence Analysis," Communications of the ACM—Homeland Security 47(3):45-47, Mar. 2004.

Dumais, S., "Improving the Retrieval of Information From External Sources," Behavior, Research Methods, Instruments and Computers 23(2):229-236, Jun. 1991.

Elgamal, TE, "A public key cryptosystem and a signature scheme based on discrete logarithms," Proceedings of the Workshop on the Theory and Application of Cryptographic Techniques (CRYPTO 1984), Lecture Notes in Computer Science (LNCS), Springer-Verlag, Berlin, 1985, vol. 196, pp. 10-18.

Friedkin, N.E., "Theoretical Foundations for Centrality Measures," American Journal of Sociology 96(6):1478-1504, May 1991.

Friedkin, N.E., and E.G. Johnsen, "Social Influence Networks and Opinion Change," Advances in Group Processes 16:1-29,1999.

Gentry, C., "Computing Arbitrary Functions of Encrypted Data," Communications of the ACM Magazine 53(3):97-105, Mar. 2010.

Gentry, C., "A Fully Homomorphic Encryption Scheme," Doctoral Dissertation, Stanford University, Stanford, Calif., Sep. 2009, 209 pages.

Gentry, C., and S. Halevi, "Implementing Gentry's Fully-Homomorphic Encryption Scheme," Proceedings of the 30th Annual International Conference on the Theory and Applications of Cryptographic Techniques, Tallinn, Estonia, May 15-19, 2011 (EUROCRYPT 2011), Lecture Notes in Computer Science (LNCS), vol. 6632, pp. 129-148.

Gentry, C., et al., "Fully Homomorphic Encryption With Polylog Overhead," Proceedings of the 31st Annual International Conference on Theory and Applications of Cryptographic Techniques (EUROCRYPT 2012), Cambridge, U.K., Apr. 2012, pp. 465-482.

Girvan, M., and M.E.J. Newman, "Community Structure in Social and Biological Networks," Proceedings of the National Academy of Sciences USA 99(12):7821-7826, Jun. 2002.

Glass, K., and R. Colbaugh, "Agile Detection of Framing Rhetoric in Social Media," Proceedings of the 2012 IEEE International Conference on Intelligence and Security Informatics, Washington DC, Jun. 2012, pp. 120-122.

Gonçalves, B., et al., "Modeling Users' Activity on Twitter Networks: Validation of Dunbar's Number," PLoS One 6(8):e22656, Aug. 2011.

"Google Exacycle Platform: What Is the Google Exacycle for Visiting Faculty Grant Program?" Feb. 10, 2014, <https://web.archive.org/web/20140210073612/http://research.google.com/university/exacycle_program.html> [retrieved Nov. 7, 2016], 2 pages.

Gourévitch, B., and J.J. Eggermont, "Evaluating Information Transfer Between Auditory Cortical Neurons," Journal of Neurophysiology 97(3):2533-2543, Mar. 2007.

Goyal, A., et al., "A Data Based Approach to Social Influence Maximization," Proceedings of the VLDB Endowment 5(1):73-84, Sep. 2011.

Goyal, A., et al., "Learning Influence Probabilities in Social Networks," Proceedings of the Third ACM International Conference on Web Search and Data Mining (WSDM '10), New York, Feb. 4-6, 2010, pp. 241-250.

"GraphLab Collaborative Filtering Library: Efficient Probabilistic Matrix/Tensor Factorization on Multicore," GraphLab: Carnegie Mellon, Apr. 26, 2012, <http:web.archive.org/web/20120426010343/http://graphlab.org/pmf.html> [retrieved Nov. 7, 2016], 5 pages.

Gupte, M., and T. Eliassi-Rad, "Measuring tie strength in implicit social networks," Proceedings of the 4th Annual ACM Web Science Conference, Jun. 2012, pp. 109-118.

Hager, W.W., "Updating the Inverse of a Matrix," SIAM Review 31(2):221-239, Jun. 1989.

Hajian, B., and T. White, "Modelling Influence in a Social Network: Metrics and Evaluation," Proceedings of the Third IEEE International Conference on Social Computing, Oct. 2011, pp. 498-500.

Hajian, B., and T. White, "On the Interaction of Influence and Trust in Social Networks," Proceedings of the ACM EC 2012 Workshop on Incentives and Trust in E-Commerce, 2012, pp. 63-74.

Hangal, S., et al., "All Friends Are Not Equal: Using Weights in Social Graphs to Improve Search," Proceedings of the Fourth SNA-KDD Workshop '10, Washington DC, <http://xenon.stanford.edu/~hangal/weightedsocialgraphs.pdf> [retrieved Nov. 7, 2016], 7 pages.

Ito, S., et al., "Extending Transfer Entropy Improves Identification of Effective Connectivity in a Spiking Cortical Network Model," PLoS One 6(11):e27431, Nov. 2011.

Jandhyala, V., "Physics-Based Field-Theoretic Design Automation Tools for Social Networks and Web Search," Proceedings of the 48th Design Automation Conference, Jun. 2011, pp. 280-281.

Kaiser, k, and T. Schreiber, "Information Transfer in Continuous Processes," Physica D: Nonlinear Phenomena 166(1-2):43-62, Jun. 2002.

Karrer, B., and M.E.J. Newman, "Stochastic Blockmodels and Community Structure in Networks," Physical Review E 83(1):016107, Jan. 2011.

Kawale, J., et al., "Churn Prediction in MMORPGs: A Social Influence Based Approach," May 2009, Technical Report No. TR 09-013, University of Minnesota, Department of Computer Science, <https://www.cs.umn.edu/research/technical_reports/view/09-013> [retrieved Nov. 7, 2016], 11 pages.

Kempe, D., et al., "Maximizing the Spread of Influence in a Social Network," Proceedings of the 9th ACM Special Interest Group on Knowledge Discovery and Data Mining (SIGKDD) International Conference on Knowledge Discovery and Data Mining, Aug. 2003, pp. 137-146.

Kendall, M., "A New Measure of Rank Correlation," Biometrika 30(1-2):81-89, Jan. 1938.

(56) References Cited

OTHER PUBLICATIONS

Khondker, H.H., "Role of the New Media in the Arab Spring," Globalizations 8(5):675-679, Oct. 2011.

Kwak, H., et al., "What is Twitter, a Social Network or a News Media?" Proceedings of the 19th International Conference on World Wide Web, New York, Apr. 2010, pp. 591-600.

Landauer, T.K., et al., "An Introduction to Latent Semantic Analysis," Discourse Processes 25(2-3):259-284, 1998.

Lauter, K, et al., "Can Homomorphic Encryption Be Practical?" Proceedings of the 3rd ACM Workshop on Cloud Computing Security, Oct. 2011, pp. 113-124.

Leavitt, A., et al., "The Influentials: New Approaches for Analyzing Influence on Twitter," The Web Ecology Project Sep. 2, 2009, 18 pages.

Leskovec, J., et al., "Meme-Tracking and the Dynamics of the News Cycle," Proceedings of the 15th ACM SIGKDD ntemational Conference on Knowledge Discovery and Data Mining, Jun. 2009, pp. 497-506.

Li, J., et al., "Social Network User Influence Dynamics Prediction," Apr. 2013, Web Technologies and Applications, vol. 7808 of Lecture Notes in Computer Science, Proceedings of the 15th Asia-Pacific Web Conference (APWeb 2013), Sydney, pp. 310-322.

Liu, Y.-H., et al., "Performance Analysis of Arithmetic Operations in Homomorphic Encryption," Purdue e-Pubs ECE Technical Reports, No. TR-ECE-10-08, Dec. 13, 2010, Purdue University, 19 pages.

Newman, M.E.J., and M. Girvan, "Finding and Evaluating Community Structure in Networks," Physical Review F 69(2):026113, Feb. 2004.

SYSTEMS AND METHODS FOR IMPROVING EFFICIENCY OF ELECTRONIC TRANSMISSION OF MESSAGES

This application claims the benefit of Provisional Application No. 62/015,814, filed Jun. 23, 2014; Provisional Application No. 61/969,968, filed Mar. 25, 2014; and Provisional Application No. 61/927,389, filed Jan. 14, 2014, the entire disclosures of which are hereby incorporated by reference herein for all purposes.

BACKGROUND

It is evident that computing devices, once connected by a network, are particularly useful for enabling communication between individuals. Various technologies have been introduced to facilitate the transmission of messages between networked computing devices and the users thereof. One such technology that is increasingly popular is the use of online social networks, or OSNs. In an OSN, users of networked computing devices participate in the OSN to transmit messages to and receive messages from other users in one-to-one and one-to-many formats.

The ability to efficiently disseminate messages that is provided by online social networks is revolutionizing the way people communicate using networked computing devices. Influential participants are able to use online social networks to spread information with unprecedented speed and reach. However, with massive numbers of participants and massive amounts of data being generated by participant activity (the so-called Big Data problem), a particular technical problem arises in that it is difficult to automatically identify which participants are the influential participants who are able to efficiently spread messages within the online social networks, particularly with respect to messages relating to a given topic.

The question of automatic identification of influential participants on OSNs has received widespread attention in the recent years. One technique promoted by many OSNs as a measure of the influence of a given participant is to count the number of followers he or she has accumulated (that is, the number of participants that will receive messages transmitted by the given participant). This metric has been shown to be inadequate, because participants who have a large number of followers are not necessarily influential in terms of spawning additional messages, such as retweets or mentions, by those followers. As such, participants who have a large number of followers are unlikely to re-share messages may not have as much actual influence as participants who have fewer followers but who are more likely to re-share messages.

Another technique considered for the identification of influential participants on OSNs is the PageRank algorithm. The PageRank algorithm has been used to address the general problem of identification of influential nodes on a network graph by relating the importance of a node to the stationary distribution of a random walk on the given network. The PageRank algorithm and its variants have thus been used to attempt to identify influential participants on OSNs, such as Twitter, based on the graph topology of the OSN. This technique is inferior, because the probability transition matrix of the PageRank technique depends entirely on the graph topology, while interaction activity is completely ignored. Further, the choice of a teleportation constant for use in PageRank may work well for determining relevance of webpages, but has no substantial basis when applied to OSNs. The same is true for ranking influential participants in an OSN based on a personalized PageRank.

Another technique for finding influential participants of OSNs finds a minimal set of seed participants which, when activated, lead to the maximum number of activated participants on the network. However, such techniques are based on time-consuming Monte Carlo analysis, and therefore are unsuitable for finding influential participants of large, real-world OSNs.

What is desired is an improvement in the ability of users to utilize networked computing device technology to broadly disseminate information via OSNs by identifying influential participants based on the actual activity interactions between participants for a given set of topics.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for efficiently transmitting an electronic message is provided. The system comprises a weight data store, at least one computing device configured to provide an influence calculation engine, and at least one computing device configured to provide an interface engine. The weight data store is configured to store information regarding interaction strengths between participants in an online social network (OSN). The influence calculation engine is configured to receive a feed representing activities between participants on the OSN; analyze the activities using a Helmholtz Green's Function (HGF) matrix (G) to determine overall influence weights that represent likelihoods that participants in the OSN will propagate messages; and store the determined overall influence weights in the weight data store. The interface engine is configured to receive a message to be propagated via the OSN; query the weight data store based on the determined weights to select one or more participants to propagate the message; and transmit the message to the selected one or more participants for propagation.

In some embodiments, a method for efficiently distributing a message is provided. A feed is received representing activities between participants in a network. The activities are analyzed using a Helmholtz Green's Function (HGF) matrix (G) to determine overall influence weights that represent likelihoods that participants in the network will propagate messages, and the determined weights are stored in a weight data store.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
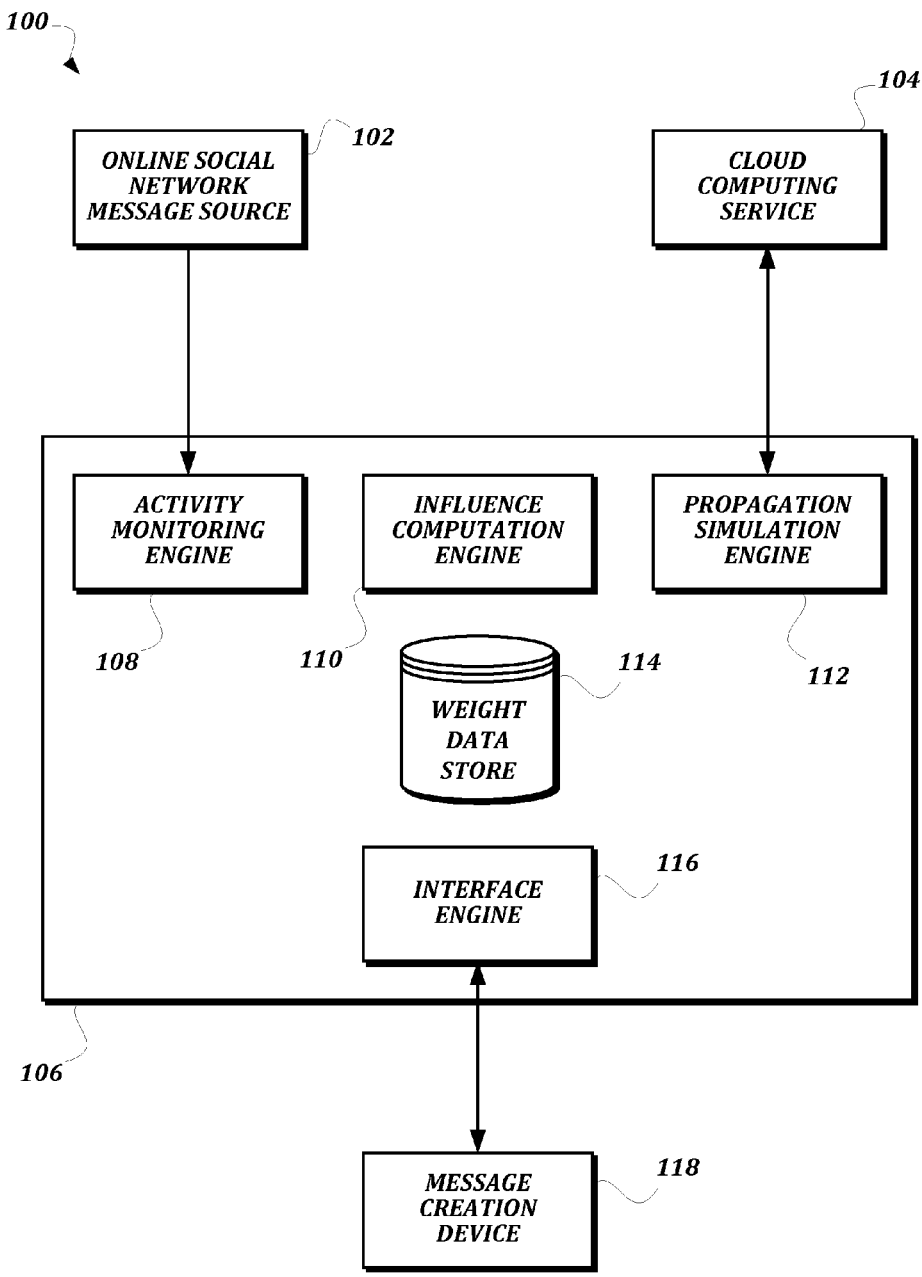
FIG. 1 is a block diagram that illustrates an exemplary embodiment of a system for improving the propagation of electronic messages according to various aspects of the present disclosure.

In the present disclosure, the challenge of identifying influential participants in order to improve the transmission of messages via large online social networks is formulated as one with sources of activity potential which are propagated locally through a probabilistic activity model that is similar to the Friedkin-Johnsen model of opinion change in social groups and scaled to significant parts of the online social networks through the graph connectivity.

In many OSNs, participants organize themselves loosely in small groups compared to the overall number of participants. For example, the average number of followers on Twitter is about 208 while the average number of followees is about 102. Similarly, on Facebook, the average number of reciprocal relationships per participant with other participants is about 190. Participants in these small groups tend to influence each other, and to propagate this influence through the link structure of the OSN.

Accordingly, in some embodiments of the present disclosure, the participant activity on an OSN is modeled as a sum of intrinsic activity and influenced activity, using a notion of "activity potential." Activity potential is the total probability $p_A^T(t,\omega)_i$ of participant i engaging in activity on a topic $\omega$ on the OSN at time t. Further, $p_A^T(t, \omega)_i$ is decomposed into intrinsic and influenced parts. The intrinsic activity potential $p_A^S$ and the influenced activity potential $p_A^I$ are weighted by the conditional probabilities of the given participant choosing to post on his or her own, and the conditional probability of the same participant choosing to be influenced by his or her connections, respectively. In a general case, these probabilities as a function of time t and topic $\omega$ may be represented as:

$$p_A^T(t,\omega)_i = (1-\alpha_{ii})(p_A^I(t,\omega)) + \alpha_{ii}(p_A^S(t,\omega)_i)$$

where $\alpha_{ii}$ is the probability of participant i choosing to post intrinsically. The probability of the influenced activity itself can be decomposed into the conditional probabilities of choosing to be influenced by each of the connections according to a set of weights, multiplied by the probability of the chosen connection engaging in that activity:

$$p_A^T(t, \omega)_i = (1 - \alpha_{ii})\left(\sum_{j \to i} w_{ij}(t, \omega) p_A^T(t, \omega)_j\right) + \alpha_{ii}(p_A^S(t, \omega)_i)$$

While the above equations include references to a topic, at least some parts of the below discussion omit the terms related to the topic for notational convenience, and the probabilities are considered to be a constant in a given time interval, such as a time interval for which activity has been monitored. One of ordinary skill in the art will recognize, in view of the discussion below, how the techniques described herein can be used on a per-topic basis, and/or over a specific time interval.

To extend the above equation to N participants of the OSN (which may encompass many of or even all of the participants of the OSN), it may be expressed in matrix form as:

$$p_A^T = (I-\alpha)W p_A^T + \alpha p_A^S$$

Here $p_A^T$ represents the vector of total activity potential of all the N participants. I is an N×N identity matrix, W is a sparse weight matrix whose rows sum to 1, $\alpha$ is a diagonal matrix that represents lack of susceptibility to the interpersonal influence, and $p_A^S$ represents a vector of intrinsic (or self) activity potentials. The weight matrix W and the diagonal matrix $\alpha$ may be determined by observing past activity on the OSN, such as past messages posted or sent by participants in the OSN.

Accordingly, the above equation relates the overall activity potentials of the participants to the intrinsic activity potential, thereby casting this framework as a "driven problem" with sources being modeled by the self-potentials and the interaction through the network giving rise to the influenced potentials in a manner similar to the electromagnetic wave propagation in inhomogeneous media. Note that this is in direct contrast to the PageRank technique, which is essentially approached as an eigenvalue problem.

The previous equation can be cast into the following form to relate the activity sources to the overall observed activity:

$$p_A^T = ((I-(I-\alpha)W)^{-1}\alpha)p_A^S$$

By drawing analogies to the wave equation in electromagnetics, the operator $((I-(I-\alpha)W)$ can be referred to as the Helmholtz operator. The matrix that relates the overall activity potential to the intrinsic activity potential may be referred to as the Helmholtz Green's Function (HGF) matrix G. The HGF matrix is then given by computing an inverse of the Helmholtz operator as follows:

$$G = H^{-1} = ((I-(I-\alpha)W)^{-1})$$

One of ordinary skill in the art will note that because the Helmholtz operator is diagonally dominant and all the off-diagonal entries are non-positive, it is an M-matrix and its inverse has all positive entries. While matrices similar in form to the HGF matrix are known by different names in various disciplines and studied in the literature on random walks, it has not in the past been used as a representation of node-to-node influence between participants in an OSN. An element of the HGF matrix, namely $G_{ij}$, represents a total activity potential of participant i realized by participant j alone engaging in activity with a probability of 1. Therefore, G, when multiplied by $\alpha$, represents the overall activity-based participant-to-participant influence by taking into account all possible paths between all participants on the network. Thus, the overall influence of a given participant j is given by the sum of the $j^{th}$ column of G multiplied by the corresponding intrinsic activity probability as:

$$I_A(j) = \left(\sum_i G_{ij}\right)\alpha_{jj}$$

The influence metric represents the amplification in the overall activity potential on the entire network caused by participant j acting alone on the network. In some embodiments, this activity potential may be calculated in a topic-dependent manner. The term $G_{jj}$ can be subtracted in the right side of the previous equation to remove the effect of self-influence. Further, the rows of the matrix G yield the proportion of the influence of various other participants on a given participant's overall activity potential.

FIG. 1 is a block diagram that illustrates an exemplary embodiment of a system 100 for improving the propagation of electronic messages according to various aspects of the present disclosure. The system 100 includes a propagation improvement system 106 that comprises one or more computing devices configured to provide an activity monitoring engine 108, an influence computation engine 110, a propagation simulation engine 112, and an interface engine 116.

In general, the term "engine" as used herein refers to logic embodied in hardware or software instructions, which can be written in a programming language, such as C, C++, Objective-C, COBOL, JAVA™, PHP, Perl, HTML, CSS, JavaScript, Ruby, VBScript, ASPX, Microsoft .NET™ languages such as C#, and/or the like. An engine may be compiled into executable programs or written in interpreted programming languages. Software engines may be callable from other engines or from themselves. Generally, the engines described herein refer to logical modules that can be merged with other engines or applications, or can be divided into sub-engines. The engines can be stored in any type of computer-readable medium or computer storage device and be stored on and executed by one or more general purpose computers, thus creating a special purpose computer configured to provide the engine.

In some embodiments, the activity monitoring engine 108 receives a feed of activity occurring on an online social network from an online social network message source 102. The online social network message source 102 may be the online social network itself, or may be a third party that provides information from the online social network. In some embodiments, the feed received by the activity monitoring engine 108 may include information regarding all of the activity occurring on the online social network, while in other embodiments, the feed may be limited to a statistically representative sample of activity occurring on the online social network, or a sample of activity that is limited by particular filtering criteria (such as language, geolocation, and/or the like). In some embodiments, the feed may include the entirety of messages transmitted on the online social network, such as tweets, posts, retweets, favorites, shares, comments, likes, connections, and/or the like. In some embodiments, the feed may be limited to only relevant portions of the messages (such as associated participant identities, message types, timestamps, hashtags, and/or the like) to reduce the amount of data to be received and processed by the activity monitoring engine 108.

In some embodiments, the influence computation engine 110 uses the activity information collected by the activity monitoring engine 108 to determine overall influence weights for participants on the online social network. One will note that the influence computation engine 110 analyzes messages actually sent via the online social network, as opposed to merely analyzing the graph topology as is done by techniques such as PageRank or follower counting. Further, because it is based on actual activity, the Green's function used by the influence computation engine 110 (as discussed further below) is a more comprehensive model than PageRank because it considers the activity-based influence from every participant to every other participant on the OSN by taking into account all direct and indirect paths of interaction. Further details of how the influence computation engine 110 determines overall influence weights for participants on the online social network are provided below.

In some embodiments, the propagation simulation engine 112 is configured to use the overall influence weights determined by the influence computation engine 110 to predict how a given message will propagate through the online social network. In some embodiments, one or more participants are chosen based on the overall influence weights, and the propagation simulation engine 112 then determines how the message will be propagated by those one or more participants. In some embodiments, the propagation simulation engine 112 may perform the simulation computations itself, while in some embodiments, the propagation simulation engine 112 may assign simulation tasks to a cloud computing service 104 and analyze the results.

Further details regarding the simulation of message propagation by the propagation simulation engine 112 are provided below.

In some embodiments, the interface engine 116 is configured to generate a user interface that provides access to the functionality of the propagation improvement system 106 to end users. For example, in some embodiments, the interface engine 116 receives a new message from a message creation device 118, and uses the overall influence weights to determine one or more participants in the online social network to most efficiently propagate the new message. Further details regarding the functionality of the interface engine 116 are provided below.

In some embodiments, the propagation improvement system 106 also comprises a weight data store 114. As understood by one of ordinary skill in the art, a "data store" as described herein may be any suitable device configured to store data for access by a computing device. In some embodiments, the data store may be a key-value store that represents data as a collection of key-value pairs, such that each key appears at most once in the collection and is usable to uniquely identify a value in the data store. Examples of key-value stores include Not Only SQL (NoSQL) data stores such as Dynamo data stores, the DynamoDB system provided by Amazon Web Services, Inc., and/or the like. These key-value stores are capable of distributed processing and therefore allow fast and reliable storage of data rows locatable by unique keys. Other examples of a data store include a highly reliable, high-speed relational database management system (DBMS) executing on one or more computing devices and accessible over a high-speed network. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

In some embodiments, the weight data store 114 is configured to store information received and/or generated by other components of the propagation improvement system 106. For example, the weight data store 114 may store activities received by the activity monitoring engine 108 for later analysis. As another example, the weight data store 114 may store overall influence weights computed by the influence computation engine 110. Further details regarding the information stored by the weight data store 114 are provided below.

Figure 2:
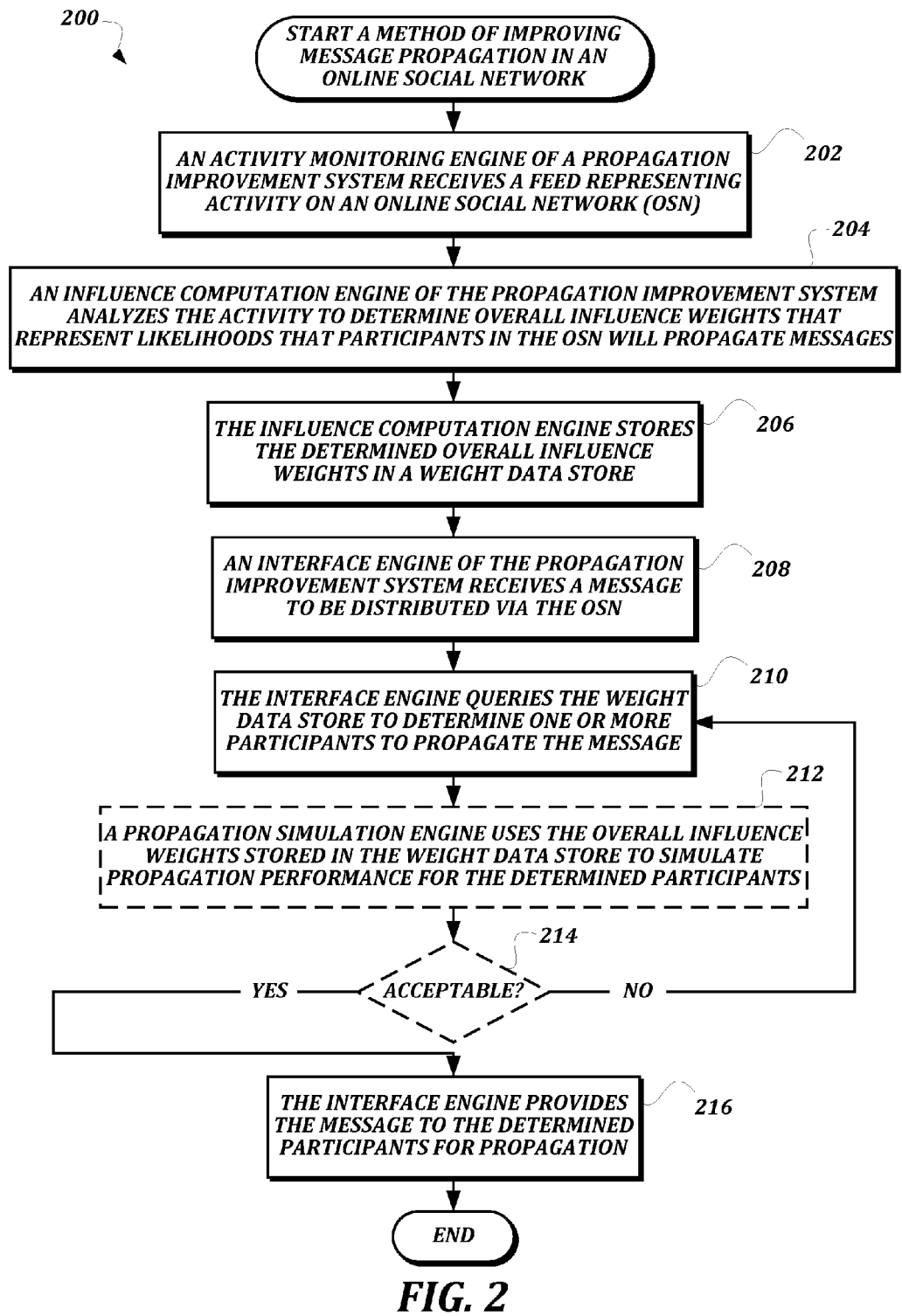
FIG. 2 is a flowchart that illustrates an exemplary embodiment of a method of improving message propagation in an online social network according to various aspects of the present disclosure.

FIG. 2 is a flowchart that illustrates an exemplary embodiment of a method of improving message propagation in an online social network according to various aspects of the present disclosure. From a start block, the method 200 proceeds to block 202, where an activity monitoring engine 108 of a propagation improvement system 106 receives a feed representing activity on an online social network (OSN). As discussed above, the feed may include the entirety of messages transmitted on the OSN, or may include a limited amount of information from the messages that is needed for the below analysis, such as a type of the message (tweet, retweet, post, comment, like, and/or the like), an identity of a transmitting participant, an identity of an influencing participant (such as the original author of a retweeted tweet, an author of a post being commented on, and/or the like), adequate message content for the derivation of a topic, and/or any other information discussed and utilized below. In some embodiments, the activity monitoring engine 108 may store the received activity information in the weight data store 114 as an intermediate step, while in other embodiments, the activity information may be provided directly to the influence computation engine 110 by the activity monitoring engine 108.

At block 204, an influence computation engine 110 of the propagation improvement system 106 analyzes the activity to determine weights that represent likelihoods that participants in the OSN will propagate messages. In some embodiments, the influence computation engine 110 is also configured to determine topics for the activities as part of the weight determination, and to compute weights on a per-topic basis. The influence computation engine 110 is configured to use an HGF matrix to determine the overall influence weights, as discussed generally above, and in more detail below.

Next, at block 206, the influence computation engine 110 stores the determined weights in a weight data store 114. Any suitable method for storing the determined weights in the weight data store 114 may be used. For example, in some embodiments, an HGF matrix G and an intrinsic activity α matrix may be stored themselves in the weight data store 114, and overall influence weights for given participants may be computed from these matrices on demand. As another example, in some embodiments a vector of overall influence weights for each participant on the OSN may be stored in the weight data store 114. As yet another example, a unique identifier may be created for each participant on the OSN, and the overall influence weight for each participant may be stored in the weight data store 114 in association with the unique identifier for the participant, such as in a key-value data store and/or the like. In some embodiments, the overall influence for each participant may be stored in the weight data store 114 in association with the topic being analyzed, in order to provide per-topic weights for future use.

The method 200 then proceeds to block 208, where an interface engine 116 of the propagation improvement system 106 receives a message to be distributed via the OSN. The interface engine 116 may receive the message via any suitable technique. For example, the message could be created by a user of the message creation device 118 within an interface provided by the interface engine 116. As another example, the message could be created by an application executing on the message creation device 118, and could be transmitted programmatically to the interface engine 116. As yet another example, the message creation device 118 could create the message and send it to a third party (such as the OSN or another third party), which would then consult the interface engine 116 regarding which participants should initially distribute the message.

At block 210, the interface engine 116 queries the weight data store 114 to determine one or more participants to propagate the message. In some embodiments, the interface engine 116 may determine a topic of the message using techniques similar to those discussed below for topic determination. In some embodiments, the interface provided by the interface engine 116 may provide a list of topics for which overall influence weights have been determined, and one or more topics for the message could be chosen by a user of the message creation device 118. Once a topic for the message has been determined, the interface engine 116 is configured to query the weight data store 114 for participants having a high overall influence weight associated with the determined topic.

Once a proposed set of one or more participants is determined, the method 200 may proceed to an optional block 212, where a propagation simulation engine 112 of the propagation improvement system 106 uses the weights stored in the weight data store 114 to simulate propagation performance for the determined participants. In some embodiments that use the optional block 212, an agent-based OSN simulator may be used to conduct Monte Carlo simulations based on the weights stored in the weight data store 114. The agent-based OSN simulator may model various nonlinearities embodied by the real-life OSN, such as differing rates of participant logins, the inability of synchronizing individual activity timelines to the same sampled times, paying attention to only the top k messages of a social feed after logging in, not responding to messages already responded to from another source, and threshold behaviors. An agent-based OSN simulator may use a parent stochastic process to simulate participant logins and parse social feeds, and a secondary stochastic process to simulate the transmission of messages. The messages may be generated as objects in main memory to help track the diffusion of the messages. In some embodiments, the simulation tasks may be decomposed and distributed to a cloud computing service 104 such as Google Exacycle and/or the like in order to take advantage of large-scale parallelism.

In some embodiments, the result of the simulations, including but not limited to depictions of the breadth and pace of message transmission, are presented by the interface engine 116. Accordingly, at optional decision block 214, a determination is made regarding whether the simulated propagation performance is acceptable. In some embodiments, the determination may be made by the user of the message creation device 118 based on the simulation results presented by the interface engine 116. In some embodiments, the determination may be made automatically by the interface engine 116 or the propagation simulation engine 112 based on predetermined propagation thresholds, or by a comparison of simulations of different sets of determined participants. If the results are determined to be acceptable, then the result of the determination at optional decision block 214 is YES, and the method 200 proceeds to block 216. Otherwise, the result of the determination at optional decision block 214 is NO, and the method 200 returns to block 210 to determine a different set of one or more participants to propagate the message.

The method 200 arrives at block 216 either upon the result of the determination at optional decision block 214 being YES, or by optional block 212 and optional decision block 214 being omitted. At block 216, the interface engine 116 provides the message to the determined participants for propagation on the OSN. In some embodiments, the determined participants may receive the message via an affiliate program, an advertising publication relationship, and/or the like. In some embodiments, the message may be submitted to the OSN for association with the determined participants. For example, some OSNs may allow promoted messages may be targeted to the followers of specified participants. In such cases, the message may be submitted to the OSN as a promoted message to be targeted to followers of the determined participants. Regardless of the technique, the message will subsequently be transmitted by the OSN to the participants influenced by the determined participants. The method 200 then proceeds to an end block and terminates.

Figure 3A:
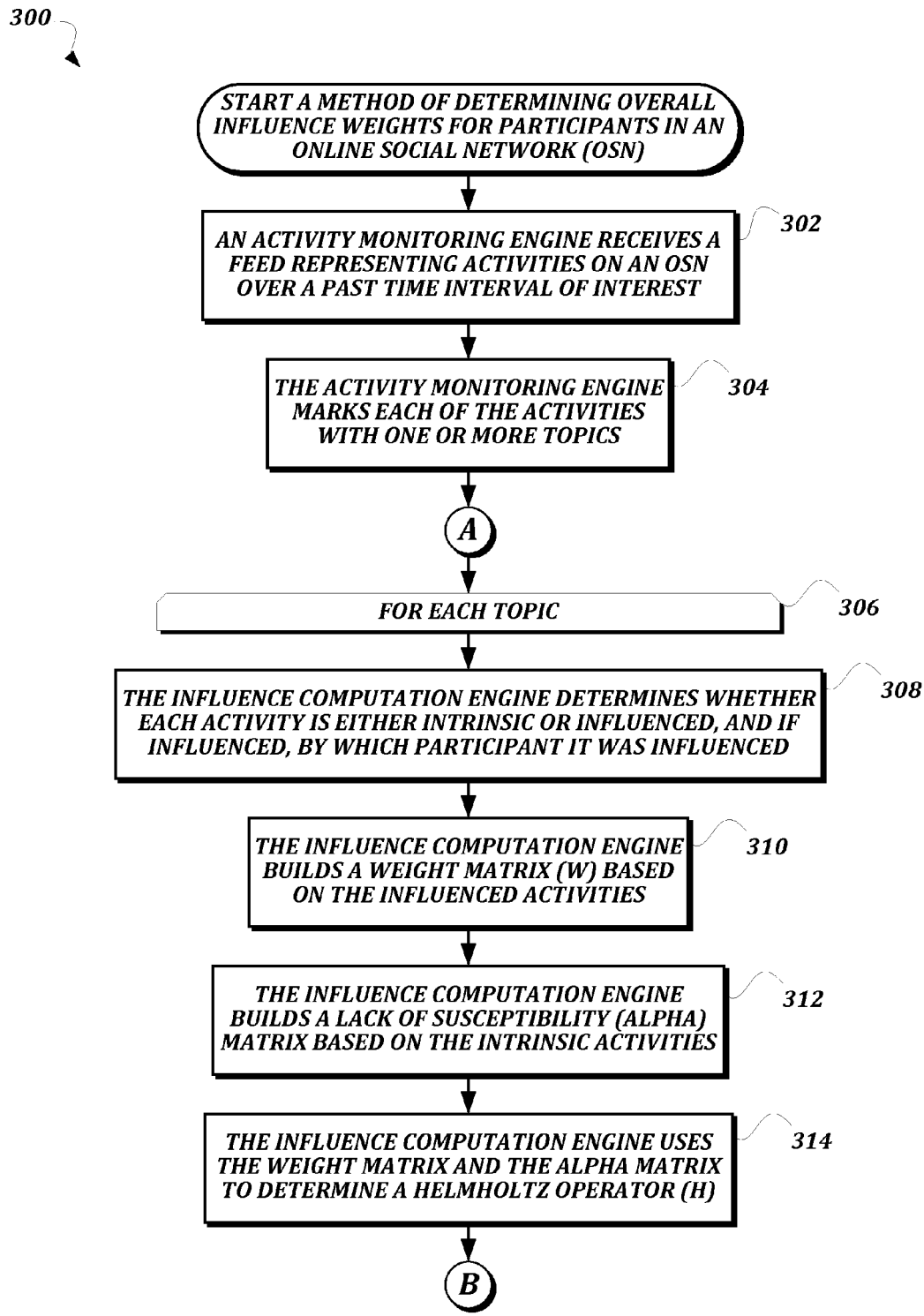
FIGS. 3A-3B are a flowchart that illustrates an exemplary embodiment of a method of determining weights for participants in an online social network according to various aspects of the present disclosure.
Figure 3B:
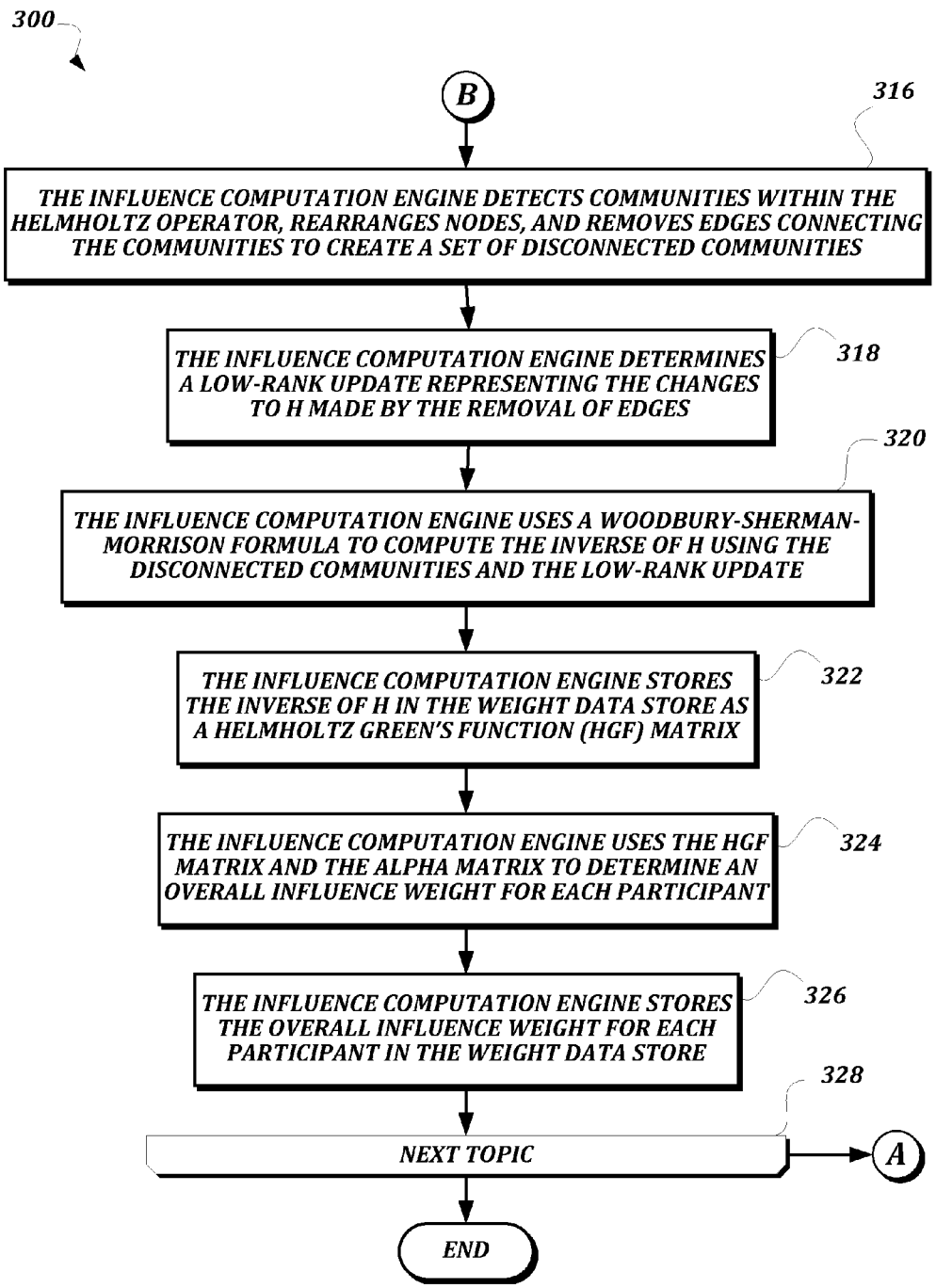

FIGS. 3A-3B are a flowchart that illustrates an exemplary embodiment of a method of determining weights for participants in an online social network (OSN), according to various aspects of the present disclosure. The method 300 is an example of a method suitable for determining the weights discussed above at block 204. From a start block, the method 300 proceeds to block 302, where an activity monitoring engine 108 receives a feed representing activities on an OSN over a past time interval of interest.

At block 304, the activity monitoring engine marks each of the activities with one or more topics. Any suitable method for topic determination may be used. For example, in some embodiments, semantic information included with the activity, such as hashtags, geographic locations, and/or the like, may be used as topics. In other embodiments, statistical analysis may be performed on the activities to automatically determine topics. For example, a modified form of Latent Semantic Analysis (LSA) may be used for topic modeling. The latent structure present in the usage of words can be utilized through the truncated Singular Value Decomposition (SVD) to extract the topics and build compact models of participant activity and weights in the social network scenario. An example application of LSA is as follows:

Let Q represent a d×n term participant matrix constructed for a corpus with n participants and d terms. $Q_{ij}$ denotes the number of times a term i occurs in the activity of participant j. The SVD of Q can be written as $Q = X\Sigma Y^T$ where the first and last matrices represent singular vectors and the central matrix is a diagonal matrix of ordered singular values. By truncating the decomposition to the k (<<n) singular values it is possible to obtain a compressed version of Q, which still retains a significant representation of participant behavior. Thus, $Q_k = X_k \Sigma_k Y_k^T$. The columns of $X_k$ denote the spectrum of k meta-topics while the columns of $Y_k^T$ denote the coefficients for the activity of the n participants along these topics, and the values of the (ordered) singular values denote the energy in each of the topics for the given corpus.

In some embodiments, once processed by the activity monitoring engine 118, the activities may then be stored in a data store such as weight data store 114 for historical record, and/or so that they may be processed later in a batch by the influence computation engine 110. In some embodiments, activities may be processed when received from the activity feed on the fly, and transmitted directly to the influence computation engine 110.

Next, the method 300 proceeds to a continuation terminal ("terminal A"), and then to a for loop 306-328 defined between a for loop start block 306 and a for loop end block 328 (FIG. 3B). In order to compute weights that are relevant to each topic, the for loop 306-328 is executed separately by the method 300 for each topic that was used to mark activities. In some embodiments, not every topic present in the corpus may be processed by the for loop 306-328. However, each topic in such a subset of topics would still be processed separately from each other.

From the for loop start block 306, the method 300 proceeds to block 308, where the influence computation engine determines whether each activity is either intrinsic or influenced, and if influenced, by which participant it was influenced. As one example, a regular tweet would be considered intrinsic activity, while a retweet, mention, or favorite would be considered influenced activity influenced by the author of the referenced tweet (or the mentioned participant). As another example, an isolated post may be considered intrinsic activity, while a second participant's post on a topic within a predetermined time period of having seen a post on the same topic from a first participant may be considered influenced activity.

At block 310, the influence computation engine 110 builds a weight matrix W based on the influenced activities, and at block 312, the influence computation engine 110 builds a lack of susceptibility matrix α (also referred to as an intrinsic matrix α) based on the intrinsic activities. Both the weight matrix W and the intrinsic matrix α are obtained from past activity traces as:

$$\alpha_{ii} = \frac{SA_i}{TA_i}; TA_i = SA_i + IA_i$$

In the above equation, $TA_i$ is the total activity of the participant i, $SA_i$ is the intrinsic activity of the participant i, and $IA_i$ is the influenced activity of the participant i. An amount of activity may be measured as a number of actions, such as posts, tweets, replies, mentions, retweets, shares, likes, comments, and/or other suitable activities on the OSN. As stated above, the actions may be tagged as either intrinsic or influenced based on the type of activity.

Various techniques may be used to determine the weights $w_{ij}$ for influenced activity in the weight matrix W. In some embodiments, a proportion of each of the connections' activities in the total influenced activity of the given participant may be considered in determining the weights for the participant i. However, such a simple technique may not provide adequate credit for connections who generate a small absolute amount of influenced activity but who have a high conversion rate to the influenced activity (that is, connections who may post rarely but whose rare posts are highly likely to be influential). Accordingly, in some embodiments, this factor is taken into account by computing weights from the activity conversion factor as:

$$w_{ij} = \frac{CF_{ij}}{\sum_{j \to i} CF_{ij}}$$

wherein $CF_{ij}$ is a proportion of activities by the second participant j that influenced activities by the first participant i.

Next, at block 314, the influence computation engine 110 uses the weight matrix W and the intrinsic matrix α to determine a Helmholtz operator H. As discussed above, the Helmholtz operator H is determined using the formula $((I-(I-\alpha)W))$. In order to determine the Helmholtz Green's function (HGF) matrix, the method 300 must then compute the inverse of the Helmholtz operator H. For real-world OSNs having tens of millions (if not hundreds of millions) of participants, the brute-force determination of the inverse of the Helmholtz operator H, which is of size N×N (where N is the number of participants), is too computationally intensive to be done in a practical amount of time, particularly if near-real time computation of weights is desirable.

Accordingly, the method 300 uses techniques to simplify the calculation of the inverse. It has been determined that many real world networks such as OSNs organize themselves as aggregates of communities with strong intra-community connection density and weak inter-community connection density. This organization can be leveraged to simplify the computation of the HGF matrix G. Computation of the Helmholtz operator H involves simple operations on the weight matrix W. Hence, by leveraging a fast community detection routine such as the Louvain method, rearranging the nodes, and removing the edges connecting the communities, a set of disconnected communities can be formed. Accordingly, from block 314, the method 300 proceeds to a continuation terminal ("terminal B"), and from terminal B (FIG. 3B) to block 316, where the influence computation engine 110 detects communities within the Helmholtz operator, rearranges nodes, and removes edges connecting the communities to create a set of disconnected communities. The Helmholtz matrix $H^C$ for the graph with k communities and the inter-community edges removed can then be written in block diagonal form as:

$$H^c = \left[ \begin{pmatrix} H_1 & \cdots & 0 \\ \vdots & \ddots & \vdots \\ 0 & \cdots & H_k \end{pmatrix} \right]$$

The superscript C denotes the graph with the inter-community edges removed. The Helmholtz operators corresponding to the disconnected communities reside on the diagonal blocks, while the rest of the entries are zeroes. The HGF matrix $G^c$ is therefore given by:

$$G^c = \left[ \begin{pmatrix} H_1^{-1} & \cdots & 0 \\ \vdots & \ddots & \vdots \\ 0 & \cdots & H_k^{-1} \end{pmatrix} \right] = \left[ \begin{pmatrix} G_1 & \cdots & 0 \\ \vdots & \ddots & \vdots \\ 0 & \cdots & G_k \end{pmatrix} \right]$$

The H matrix for the overall graph is then expressed as the sum of the matrix and a very sparse perturbation which is the H matrix corresponding to the edges between the communities. Thus, the terms can be expressed as $H=+\Delta H$, and $\Delta H$ can be written in the form of a low-rank update $\Delta H=UV^T$. At block 318, the influence computation engine 110 determines such a low-rank update representing the changes to the Helmholtz operator H made by the removal of edges. If the total number of nodes in the graph is N, and r is the number of nodes affected by the perturbation represented by this equation, then U is a sparse matrix of size N×r containing the node-wise change in H, while V is a matrix of size N×r containing ones at the positions of the change while the rest of the elements of V are zero.

Once this low-rank update is determined, the method proceeds to block 320, where the influence computation engine 110 uses a Woodbury-Sherman-Morrison (WSM) formula to compute the inverse of the Helmholtz operator H using the disconnected communities and the low-rank update. The WSM formula used to compute the inverse of the Helmholz operator H from the above-described elements is as follows:

$$G=H^{-1}=H^{C^{-1}}(I-U(I+VH^{C^{-1}}U)^{-1}VH^{C^{-1}})$$

The method 300 then proceeds to block 322, where the influence computation engine 110 stores the inverse of the Helmholtz operator H in the weight data store 114 as a Helmholtz Green's Function (HGF) matrix. At block 324, the influence computation engine 110 uses the HGF matrix G and the intrinsic activity α matrix to determine an overall influence for each participant. As discussed above, the influence of a given participant j is given by the sum of the $j^{th}$ column of G multiplied by the corresponding lack of susceptibility entry ($\alpha_{jj}$).

Next, at block 326, where the influence computation engine 110 stores the overall influence for each participant in the weight data store 114. As discussed above, any suitable means for storing the overall influence for each participant may be used. The method 300 then proceeds to the for loop end block 328. If further topics remain to be processed, the method 300 returns to terminal A, and then to the for loop start block 306 to repeat the for loop 306-328 for the next topic. Otherwise, if no further topics remain to be processed, the method 300 proceeds to an end block and terminates.

Though not illustrated, in some embodiments the activity monitoring engine 108 and the influence computation engine 110 may continue to dynamically update the overall influence values as new activities are received from the online social network message source 102. The acceleration provided by computation of smaller inverses corresponding to the H matrices of the communities and then applying a low-rank update, instead of performing the brute force inversion of the entire H matrix at once, allows such computations to be performed repeatedly, and so for changes in the influence of the participants of the OSN to be quickly represented in the weight data store 114. In the normal course of operation, once a method such as method 300 has been fully performed in order to compute the initial overall influence weights for each participant the low-rank update steps of the method 300 (that is, the actions starting with those described above in block 318) can be used to recomputed the changes to the HGF matrix and the overall influence weights of the participants without performing the earlier calculations described in the method 300.

The above discussion primarily describes the analysis of activity on OSNs such as Twitter, Facebook, and/or the like. However, one of ordinary skill in the art will recognize that similar techniques are applicable to any communication network where the nodes engage in activity that diffuses along the edges of the network. Some non-limiting examples of such a network are blogs that support TrackBack or other links such as WordPress and Movable Type; scholarly articles or other publications that reference each other; and/or the like. One of ordinary skill in the art will also recognize that while the above discussion primarily relates to nodes that represent users of computing devices that are participating in the OSN by creating and transmitting messages, in some embodiments, one or more nodes in the network may correspond to another source of user input, an autonomous computing device that does not receive user input or control before transmitting a message via the OSN, or combinations thereof.

Further, one of ordinary skill in the art will recognize that while in some embodiments, a new message is transmitted via the same network from which the activity was monitored, in other embodiments the techniques described above may be used to determine influential participants by using the monitored OSN activity, but that the new message may then be transmitted to the influential participants via some other medium or technique and may be disseminated by the influential participants via some other medium or technique. For example, the techniques described above may be used to determine a journalist of particular influence based on OSN activity. Subsequently, information may be provided to the influential journalist via an email or telephone conversation with the intent that the influential journalist will spread the information via one or more media outlets available to the journalist. As another example, the techniques described above may be used to determine an influential participant who could subsequently be engaged as a spokesperson to disseminate a particular message.

One of ordinary skill in the art will also recognize that the above techniques for determining influential participants may also be used to inhibit message propagation (as opposed to improving message propagation), in order to limit the dissemination of undesirable messages such as harmful rumors, harassment, sensitive information, and/or the like. Once overall influence weights are calculated and influential participants are determined for a given undesirable topic, activity from those influential participants can be partially or completely blocked in order to reduce the propagation of messages relating to the topic. For example, the party seeking to limit the spread of the undesirable messages can send one or more complaints to the proprietor of the OSN, and the OSN can then take action to either completely block or suspend the activity of the participants, or can probabilistically drop some percentage of messages from the participants to reduce the message spread while reducing a likelihood that the participants will realize that action has been taken.

Figure 4:
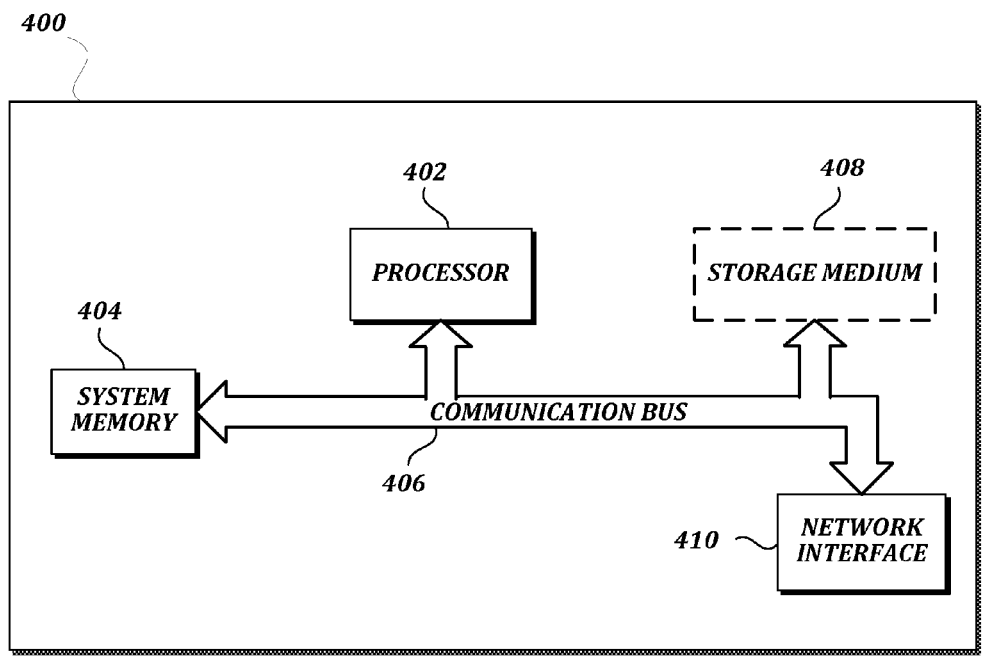
FIG. 4 is a block diagram that illustrates aspects of an exemplary computing device appropriate for use with embodiments of the present disclosure.

FIG. 4 is a block diagram that illustrates aspects of an exemplary computing device 400 appropriate for use with embodiments of the present disclosure. While FIG. 4 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 400 may be any one of any number of currently available or yet to be developed devices.

In its most basic configuration, the computing device 400 includes at least one processor 402 and a system memory 404 connected by a communication bus 406. Depending on the exact configuration and type of device, the system memory 404 may be volatile or nonvolatile memory, such as read only memory ("ROM"), random access memory ("RAM"), EEPROM, flash memory, or similar memory technology. Those of ordinary skill in the art and others will recognize that system memory 404 typically stores data and/or program modules that are immediately accessible to and/or currently being operated on by the processor 402. In this regard, the processor 402 may serve as a computational center of the computing device 400 by supporting the execution of instructions.

As further illustrated in FIG. 4, the computing device 400 may include a network interface 410 comprising one or more components for communicating with other devices over a network. Embodiments of the present disclosure may access basic services that utilize the network interface 410 to perform communications using common network protocols. The network interface 410 may also include a wireless network interface configured to communicate via one or more wireless communication protocols, such as WiFi, 2G, 3G, LTE, WiMAX, Bluetooth, and/or the like.

In the exemplary embodiment depicted in FIG. 4, the computing device 400 also includes a storage medium 408. However, services may be accessed using a computing device that does not include means for persisting data to a local storage medium. Therefore, the storage medium 408 depicted in FIG. 4 is represented with a dashed line to indicate that the storage medium 408 is optional. In any event, the storage medium 408 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 404 and storage medium 408 depicted in FIG. 4 are merely examples of computer-readable media.

Suitable implementations of computing devices that include a processor 402, system memory 404, communication bus 406, storage medium 408, and network interface 410 are known and commercially available. For ease of illustration and because it is not important for an understanding of the claimed subject matter, FIG. 4 does not show some of the typical components of many computing devices. In this regard, the computing device 400 may include input devices, such as a keyboard, keypad, mouse, microphone, touch input device, touch screen, tablet, and/or the like. Such input devices may be coupled to the computing device 400 by wired or wireless connections including RF, infrared, serial, parallel, Bluetooth, USB, or other suitable connections protocols using wireless or physical connections. Similarly, the computing device 400 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer-readable storage medium associated with a computing device.

While illustrative embodiments have been illustrated and described, it will be appreciated that various changes can be made therein without departing from the spirit and scope of the present disclosure.

The invention claimed is:

1. A system for efficiently transmitting an electronic message, the system comprising:
   a weight data store configured to store information regarding interaction strengths between participants in an online social network (OSN);
   at least one computing device configured to provide an influence calculation engine configured to:
      receive a feed representing activities between participants on the OSN;
      analyze the activities using a Helmholtz Green's Function (HGF) matrix (G) to determine overall influence weights that represent likelihoods that participants in the OSN will propagate messages; and
      store the determined weights in the weight data store; and
   at least one computing device configured to provide an interface engine configured to:
      receive a message to be propagated via the OSN;
      query the weight data store based on the determined weights to select one or more participants to propagate the message; and
      transmit the message to the selected one or more participants for propagation.

2. The system of claim 1, further comprising at least one computing device configured to provide a propagation simulation engine configured to:
receive the message to be propagated and the determined one or more participants from the interface engine; and
use the weights stored in the weight data store to simulate propagation performance of the message for the determined one or more participants.

3. The system of claim 2, wherein simulating propagation performance of the message includes:
decomposing simulation tasks into a plurality of subtasks;
transmitting the plurality of subtasks for execution by a cloud computing platform; and
receiving the simulation results from the cloud computing platform.

4. The system of claim 1, wherein determining weights includes using the activities to calculate a weight matrix (W) that describes influenced activity probabilities and a diagonal matrix ($\alpha$) that describes intrinsic activity probabilities.

5. The system of claim 4, wherein weights for the weight matrix (W) for a first participant (i) influenced by a second participant (j) are determined using the formula:

$$w_{ij} = \frac{CF_{ij}}{\sum_{j \to i} CF_{ij}}$$

wherein $CF_{ij}$ is a proportion of activities by the second participant (j) that influenced activities by the first participant (i).

6. The system of claim 4, wherein weights for the diagonal matrix ($\alpha$) for intrinsic activity for a first participant (i) are determined using the formula:

$$\alpha_{ii} = \frac{SA_i}{TA_i}; TA_i = SA_i + IA_i$$

wherein $TA_i$ is the total activity of the first participant (i),
wherein $SA_i$ is the intrinsic activity of the first participant (i), and
wherein $IA_i$ is the influenced activity of the first participant (i).

7. The system of claim 4, wherein using a Helmholtz Green's Function (HGF) matrix (G) to determine weights includes:
calculating a Helmholtz operator (H) according to the formula:

$$H=(I-(I-\alpha)W)$$

wherein I is the N×N identity matrix; and
calculating the Helmholtz Green's Function (HGF) matrix (G) by inverting the Helmholtz operator (H) according to the formula:

$$G=H^{-1}$$

wherein each weight represents the overall influence of a given participant (j), and is given by the sum of the $j^{th}$ column of G multiplied by a self-weight according to the formula:

$$I_A(j) = \left(\sum_i G_{ij}\right)\alpha_{jj}.$$

8. The system of claim 7, wherein inverting the Helmholtz operator (H) includes:
using a community detection routine to find communities within the Helmholtz operator (H);
rearranging nodes and removing edges connecting the communities to form a set of disconnected communities; and
using a Woodbury-Sherman-Morrison (WSM) formula to accelerate computation of the inverse of the Helmholtz operator (H).

9. The system of claim 8, wherein using the Woodbury-Sherman-Morrison (WSM) formula to accelerate computation of the inverse of the Helmholtz operator (H) includes using the formula:

$$H^{-1}=H^{C^{-1}}(I-U(I+VH^{C^{-1}}U)^{-1}VH^{C^{-1}})$$

wherein $H^C$ is a matrix representing the Helmholtz operator (H) after the inter-community edges have been removed;
wherein U is a sparse matrix of size N×r containing the node-wise change in H, wherein r is the number of nodes affected and N is the total number of nodes; and
wherein V is a matrix of size N×r containing ones at positions of changes and zeroes in a remainder of elements.

10. The system of claim 8, wherein the weight determination engine is further configured to:
receive additional information from the feed representing additional activities between participants on the OSN; and
using the WSM formula to update the HGF matrix based on the additional information.

11. The system of claim 1, wherein analyzing the activities includes:
determining a topic for each activity; and
determining overall influence weights that represent likelihoods that participants in the OSN will propagate messages according to the topic of the messages and topics of the activities.

12. A method for efficiently distributing an electronic message, the method comprising:
receiving a feed representing activities between participants in an online social network (OSN);
analyzing the activities using a Helmholtz Green's Function (HGF) matrix (G) to determine overall influence weights that represent likelihoods that participants in the OSN will propagate messages;
storing the determined weights in a weight data store;
receiving a message to be propagated via the OSN;
querying the weight data store based on the determined weights to select one or more participants to propagate the message; and
transmitting the message to the selected one or more participants for propagation.

13. The method of claim 12, wherein determining weights includes using the activities to calculate a weight matrix (W) that describes influenced activity probabilities and a diagonal matrix ($\alpha$) that describes intrinsic activity probabilities.

14. The method of claim 13, wherein weights for the weight matrix (W) for a first participant (i) influenced by a second participant (j) are determined using the formula:

$$w_{ij} = \frac{CF_{ij}}{\sum_{j \to i} CF_{ij}}$$

wherein $CF_{ij}$ is a proportion of activities by the second participant (j) that influenced activities by the first participant (i).

15. The method of claim 13, wherein weights for the diagonal matrix (α) for intrinsic activity for a first participant (i) are determined using the formula:

$$\alpha_{ii} = \frac{SA_i}{TA_i}; TA_i = SA_i + IA_i$$

wherein $TA_i$ is the total activity of the first participant (i),
wherein $SA_i$ is the intrinsic activity of the first participant (i), and
wherein $IA_i$ is the influenced activity of the first participant (i).

16. The method of claim 13, wherein using a Helmholtz Green's Function (HGF) matrix (G) to determine weights includes:
calculating a Helmholtz operator (H) according to the formula:

$$H=(I-(I-\alpha)W)$$

wherein I is the N×N identity matrix; and
calculating the Helmholtz Green's Function (HGF) matrix (G) by inverting the Helmholtz operator (H) according to the formula:

$$G=H^{-1}$$

wherein each weight represents the overall influence of a given participant (j), and is given by the sum of the $i^{th}$ column of G multiplied by a self-weight according to the formula:

$$I_A(j) = \left(\sum_i G_{ij}\right)\alpha_{jj}.$$

17. The method of claim 16, wherein inverting the Helmholtz operator (H) includes:
using a community detection routine to find communities within the Helmholtz operator (H);
rearranging nodes and removing edges connecting the communities to form a set of disconnected communities; and
using a Woodbury-Sherman-Morrison (WSM) formula to accelerate computation of the inverse of the Helmholtz operator (H) by using the formula:

$$H^{-1}=H^{C^{-1}}(I-U(I+VH^{C^{-1}}U)^{-1}VH^{C^{-1}})$$

wherein $H^C$ is a matrix representing the Helmholtz operator (H) after the inter-community edges have been removed;
wherein U is a sparse matrix of size N×r containing the node-wise change in H, wherein r is the number of nodes affected and N is the total number of nodes; and
wherein V is a matrix of size N×r containing ones at positions of changes and zeroes in a remainder of elements.

18. The method of claim 17, further comprising:
receiving additional information from the feed representing additional activities between participants in the OSN; and
using the WSM formula to update the HGF matrix based on the additional information.

* * * * *